US007082467B2

(12) United States Patent
Border et al.

(10) Patent No.: US 7,082,467 B2
(45) Date of Patent: Jul. 25, 2006

(54) METHOD AND DEVICE FOR SELECTIVE TRANSPORT LEVEL SPOOFING BASED ON INFORMATION IN TRANSPORT LEVEL PACKET

(75) Inventors: John Border, Boyds, MD (US); Matthew Butehorn, Mt. Airy, MD (US)

(73) Assignee: Hughes Network Systems, Germantown, MD (US)

( * ) Notice: Subject to any disclaimer, the term of this patent is extended or adjusted under 35 U.S.C. 154(b) by 555 days.

(21) Appl. No.: 09/879,020

(22) Filed: Jun. 12, 2001

(65) Prior Publication Data

US 2002/0133596 A1    Sep. 19, 2002

Related U.S. Application Data

(63) Continuation-in-part of application No. 09/664,165, filed on Sep. 18, 2000, now Pat. No. 6,973,497.

(60) Provisional application No. 60/220,026, filed on Jul. 21, 2000, provisional application No. 60/181,597, filed on Feb. 10, 2000.

(51) Int. Cl.
   *G06F 15/16* (2006.01)
   *H04J 3/20* (2006.01)
(52) U.S. Cl. ............... 709/227; 370/316; 709/217
(58) Field of Classification Search ........ 709/200–203, 709/217–226, 227–232; 701/13; 370/395.52, 370/395.41, 333, 404; 714/705; 719/310, 719/311, 315–318; 718/114, 115; 725/48
See application file for complete search history.

(56) References Cited

U.S. PATENT DOCUMENTS

| 5,541,911 | A |   | 7/1996  | Nilakantan et al. ......... 370/422 |
| 5,828,468 | A |   | 10/1998 | Lee et al. .................... 358/434 |
| 5,958,053 | A | * | 9/1999  | Denker ....................... 713/201 |
| 5,995,042 | A | * | 11/1999 | Durboraw et al. ..... 342/357.02 |

(Continued)

FOREIGN PATENT DOCUMENTS

EP    0 903 905 A2    3/1999

(Continued)

*Primary Examiner*—John Follansbee
*Assistant Examiner*—Haresh Patel
(74) *Attorney, Agent, or Firm*—Craig Plastrik

(57) ABSTRACT

A method and apparatus for enhancing the performance of a network by performing selective spoofing, i.e., determining whether or not to spoof a connection. Selective spoofing provides the ability to discriminate among different connections, only allocating TCP spoofing resources to those where spoofing will improve performance and assigning spoofing parameters based on the specific applications using the connections. The selective spoofing is applicable to a wide variety of communication links, including both slow and fast links, high latency links, and links with low and high error rates. The selective spoofing functions are used either alone or together with other performance enhancing features. Those features include spoofing the conventional TCP three-way handshake, local data acknowledgement, multiplexing multiple connections across a single connection, data compression/encryption, prioritization, and path selection. The selective spoofing is particularly useful for links with high latency and/or high bit error rates.

40 Claims, 4 Drawing Sheets

U.S. PATENT DOCUMENTS

| | | | |
|---|---|---|---|
| 5,999,274 A | 12/1999 | Lee et al. | 358/434 |
| 6,003,084 A * | 12/1999 | Green et al. | 709/227 |
| 6,006,264 A | 12/1999 | Colby et al. | 709/226 |
| 6,076,113 A | 6/2000 | Ramanathan et al. | 709/235 |
| 6,178,450 B1 | 1/2001 | Ogishi et al. | 709/224 |
| 6,182,226 B1 * | 1/2001 | Reid et al. | 713/201 |
| 6,205,481 B1 | 3/2001 | Heddaya et al. | 709/226 |
| 6,233,429 B1 * | 5/2001 | Soffer et al. | 455/12.1 |
| 6,327,626 B1 * | 12/2001 | Schroeder et al. | 709/236 |
| 6,415,329 B1 * | 7/2002 | Gelman et al. | 709/245 |
| 6,452,915 B1 * | 9/2002 | Jorgensen | 370/338 |
| 6,484,210 B1 | 11/2002 | Adriano et al. | 709/239 |
| 6,591,306 B1 | 7/2003 | Redlich | 709/245 |
| 6,701,370 B1 | 3/2004 | Dillon | 709/230 |
| 6,850,512 B1 * | 2/2005 | Bishop et al. | 370/342 |
| 2001/0043600 A1 * | 11/2001 | Chatterjee et al. | 370/390 |

FOREIGN PATENT DOCUMENTS

| | | |
|---|---|---|
| FR | 2 778 804 | 11/1999 |
| WO | WO 95/34153 | 12/1995 |

* cited by examiner

Fig. 4

Determine what application is using TCP connection

Fig. 5

Vary MSS using selection rule that distinguishes between two hosts by application

Fig. 6

Vary three-way handshake using selection rule that distinguishes between two hosts by application

Fig. 7

Vary connection priority using selection rule that distinguishes between two hosts by application

METHOD AND DEVICE FOR SELECTIVE TRANSPORT LEVEL SPOOFING BASED ON INFORMATION IN TRANSPORT LEVEL PACKET

CROSS-REFERENCE TO RELATED APPLICATIONS

This application is a continuation in part and claims the benefit under 35 U.S.C. § 120 of U.S. Non-Provisional Application of John Border et al. entitled "Selective Spoofer and Method of Performing Selective Spoofing", Ser. No. 09/664,165 now U.S. Pat. No. 6,973,497, filed on Sep. 18, 2000, the benefit under 35 U.S.C. § 119(e) of U.S. Provisional Application of John Border et al. entitled "Selective TCP Spoofing", Ser. No. 60/181,597, filed on Feb. 10, 2000, and a U.S. Provisional Application of John Border et al. entitled "Performance Enhancing Proxy", Ser. No. 60/220,026, filed on Jul. 21, 2000, the entire contents of all of which are incorporated by reference herein.

The present application is also related to co-pending application in the name of John Border et al., entitled "Performance Enhancing Proxy and Method for Enhancing Performance", Ser. No. 09/662,072, filed on Sep. 14, 2000.

BACKGROUND OF THE INVENTION

The present invention is generally directed to a method and apparatus for performing selective spoofing of protocols on network paths, and more particularly, a method and apparatus for selective spoofing of the TCP/IP protocol on the Internet, to improve performance.

DESCRIPTION OF THE RELATED ART

The transmission control protocol (TCP) is the dominant protocol in use today on the Internet. TCP is carried by the Internet protocol (IP) and is used in a variety of applications including reliable file transfer and Internet web page access applications. The four layers of the TCP/IP protocol suite are illustrated in FIG. 1. As illustrated, the link layer (or the network interface layer) 10 includes device drivers in the operating system and any corresponding network interface cards. Together, the device driver and the interface cards handle hardware details of physically interfacing with any cable or whatever type of media is being used. The network layer (also called the Internet layer) 12 handles the movement of packets around the network. Routing of packets, for example, takes place at the network layer 12. IP, Internet control message protocol (ICMP), and Internet group management protocol (IGMP) may provide the network layer in the TCP/IP protocol suite. The transport layer 14 provides a flow of data between two hosts, for the application layer 16 above.

In the TCP/IP protocol suite, there are at least two different transport protocols, TCP and a user datagram protocol (UDP). TCP, which provides a reliable flow of data between two hosts, is primarily concerned with dividing the data passed to it from the application layer 16 into appropriately sized chunks for the network layer 12 below, acknowledging received packets, setting timeouts to make certain the other end acknowledges packets that are sent, and so on. Because this reliable flow of data is provided by the transport layer 14, the application layer 16 can ignore these details. UDP, on the other hand, provides a much simpler service to the application layer 16. UDP just sends packets of data called datagrams from one host to another, but there is no guarantee that the datagrams reach the other end. Any desired reliability must be added by the application layer 16.

The application layer 16 handles the details of the particular application. There are many common TCP/IP applications that almost every implementation provides. These include telnet for remote log-in, the file transfer protocol (FTP), the simple mail transfer protocol (SMTP) or electronic mail, the simple network management protocol (SNMP), the hypertext transfer protocol (http), and many others.

As described above, TCP provides reliable, in-sequence delivery of data between two IP hosts. The IP hosts set up a TCP connection, using a conventional TCP three-way handshake and then transfer data using a window based protocol with the successfully received data being acknowledged.

TCP was designed to be very flexible and works over a wide variety of communication links, including both slow and fast links, high latency links, and links with low and high error rates. However, while TCP (and other high layer protocols) works with many different kinds of links, TCP performance, in particular, the throughput possible across the TCP connection, is affected by the characteristics of the link in which it is used. There are many link layer design considerations that should be taken into account when designing a link layer service that is intended to support Internet protocols. However, not all characteristics can be compensated for by choices in the link layer design. TCP has been designed to be very flexible with respect to the links which it traverses.

An alternative to a tailored protocol is the use of performance enhancing proxies (PEPs), to perform a general class of functions termed "spoofing," in order to improve performance over impaired (i.e., high latency or high error rate) links. Spoofing involves an intermediate network device (the performance enhancing proxy (PEP)) intercepting and altering, through the addition and/or deletion of TCP (in this example) segments, the behavior of the TCP connection in an attempt to improve its performance.

TCP protocol throughput performance suffers in environments with long delays and/or high bit error rates. TCP spoofing is used to improve TCP throughput by locally acknowledging TCP data received and then taking on the responsibility for delivering the data, using mechanisms tailored for the particular environment. For example, as set forth above, TCP is often used when an application must reliably send data from one end system to another end system. The TCP "sender" includes sequence numbers in the data it sends. The TCP "receiver" uses the sequence numbers to acknowledge data it has received. If a data segment is lost in transit, the TCP sender will not receive an acknowledgement for the segment and will retransmit it.

The rate at which a TCP sender can send data to a TCP receiver is limited by a window. The window defines how much data the TCP sender can have "in flight" to the receiver (i.e., how much data can be outstanding, awaiting acknowledgement). The TCP sender dynamically adjusts the size of the window based on network conditions, but the window has an upper bound determined by the TCP receiver's advertised available buffer space. The TCP throughput possible with a particular window size is determined by the rate at which acknowledgments are received. With any particular window size, longer acknowledgment time means lower throughput. The time it takes for TCP data to be acknowledged is known as the TCP round trip time (RTT).

TCP spoofing is a technique used to improve TCP throughput in environments with long RTTs. An example of such an environment is an environment that includes a high latency link, such as a geosynchronous satellite link. TCP spoofing works by having a gateway at the edge of a high latency link "locally" acknowledging TCP data it receives. The local acknowledgments reduce the RTT perceived by the TCP sender, allowing the TCP sender to send more data more quickly, thereby improving throughput. The TCP spoofing gateway then uses protocol rules tailored for the high latency link for forwarding the data across the link. The TCP spoofing gateway also takes on the responsibility of retransmitting any packets lost after they have been acknowledged by the gateway. This can be done by buffering the data until an acknowledgment for the data is received from across the link and retransmitting data for which no acknowledgment is received.

As outlined above, conventional TCP spoofing implementations include the local acknowledgement of TCP data segments in order to get the TCP data sender to send additional data sooner than it would have sent if spoofing were not being performed, thus improving the throughput of the TCP connection. Generally, conventional TCP spoofing implementations have focused simply on increasing the throughput of the TCP connections either by using larger windows over the link or by using compression to reduce the amount of data which needs to be sent, or both.

However, not every application that desires reliable delivery of data requires a high throughput TCP connection. For example, a Telnet application typically operates by sending single messages back and forth between two end systems. These messages must be reliably delivered, but are small enough to each be sent in a single TCP segment. Another, more complex example is the file transfer protocol (FTP). An FTP application actually uses two TCP connections, one to send FTP control messages and the other to send data. The FTP application requires reliable delivery for both the control messages and the data. However, high throughput is required only for the data TCP connection, not for the control TCP connection.

Existing TCP spoofing implementations allocate TCP spoofing resources (i.e., buffer space, control blocks, etc.) dynamically as TCP connections are established and detected by the TCP spoofing gateway, without taking into account the type of application which is using the TCP connection. All TCP connections, regardless of whether or not they will benefit from spoofing (i.e., will benefit from the high throughput), are spoofed up until all the TCP spoofing resources have been allocated. Any additional TCP connections which are detected must pass through unspoofed, even if they are associated with applications which require high throughput.

SUMMARY OF THE INVENTION

The present invention is directed to a method and apparatus for enhancing the performance of a network.

The present invention is directed to a method and apparatus for enhancing the performance of a network by selectively spoofing connections, in particular, only spoofing connections for which spoofing will actually improve performance. In addition, the method and apparatus may be extended to allow the selection criteria to not only select which connections are spoofed but also, when spoofed, what set of parameters are used by the spoofer for the connection.

The selective spoofing functions of the present invention are applicable to a wide variety of communication links, including both slow and fast links, high latency links, and links with low and high error rates.

In one exemplary embodiment, the method and apparatus of the present invention discriminate among different connections and only apply spoofing resources (i.e., buffer space, control blocks etc.,) to connections for which spoofing will actually improve performance. In one example, connections which can actually benefit from spoofing include connections with contain enough data to send to take advantage of the higher potential throughput. In one example, these connections are high speed, high data rate connections.

In another exemplary embodiment, the method and apparatus of the invention further discriminates among different connections for which spoofing is selected and applies different parameters (e.g. retry counts, retransmission timeouts, initial window sizes, etc.) to the different connections, further improving performance for each connection by using spoofing parameters tailored to the particular application.

In another exemplary embodiment, which connections are spoofed is dynamically configurable either automatically or manually (via an operator), allowing the user or operator to decide which connections get improved performance based on local policy.

BRIEF DESCRIPTION OF THE DRAWINGS

FIG. 4 shows determining what application is using a TCP connection; and

FIGS. 5, 6, and 7 respectively depict varying MSS, three-way handshake, and connection priority using a selection rule that distinguishes between hosts by application.

DETAILED DESCRIPTION OF THE PREFERRED EMBODIMENTS

Figure 1:
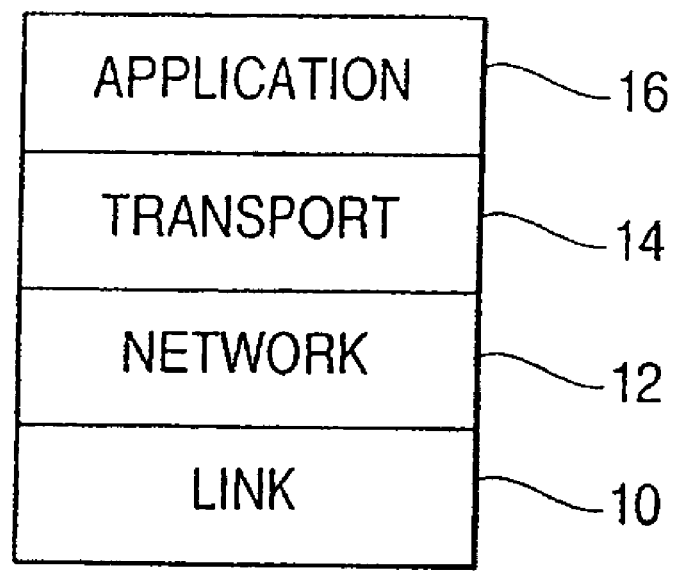
FIG. 1 illustrates the four layers of the conventional TCP/IP protocol suite.
Figure 2:
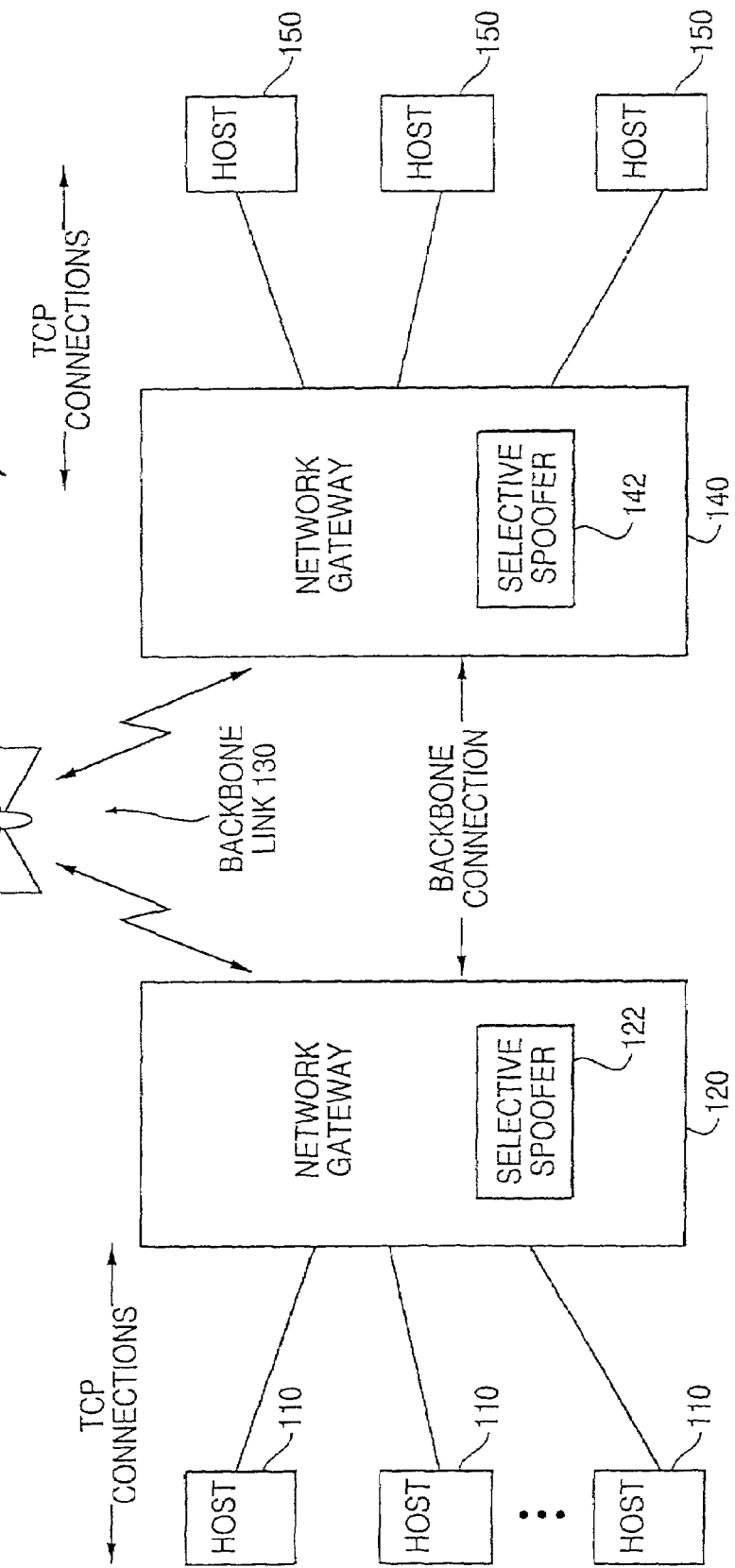
FIG. 2 illustrates an exemplary network in which the selective spoofer of the present invention is implemented.

FIG. 2 illustrates an exemplary network 100 in which the selective spoofer 122, 142 of the present invention may be utilized. The network 100 in FIG. 2 includes a plurality of hosts 110 connected to a network gateway 120 via TCP connections. The network gateway 120 is connected to another network gateway 140 via a backbone connection on a backbone link 130. In FIG. 2, the backbone link 130 is depicted as a satellite link, however this is only exemplary. The network gateway 140 is further connected to a second group of hosts 150, also via TCP connections. In the arrangement illustrated in FIG. 2, the network gateways 120, 140 and their associated selective spoofers 122, 142 facilitate communication between the groups of hosts 110, 150.

The operation of the selective spoofer 122 is described below in conjunction with the flowcharts 200 of FIGS. 3A and 3B. In FIG. 3A, as set forth in step 210, the selective spoofer 122 discriminates among various TCP connections based on the applications using them. If the application is determined to be eligible for TCP spoofing in step 220, then TCP resources are allocated (step 230) and TCP spoofing is performed (step 240). If the connection is not eligible for spoofing in step 220, it is forwarded unspoofed (step 250). In FIG. 3B, in addition to the discrimination (at step 210) to determine which connections are spoofed, additional discrimination is included (at step 224) to allow the selection of different parameters sets (at step 228) for use with different applications. For example, an application located in a host which is located on the same LAN segment as the spoofer may use a parameter set with a smaller initial retransmission timeout than an application which is located in a host which is located on a LAN segment which is located some distance away (e.g. across a wide area link).

As a result, the selective spoofer 122 conserves TCP spoofing resources for only those TCP connections for which high throughput is required and may also improve the performance of spoofed connections by using application specific sets of parameters. The selective spoofer 122 also increases the number of TCP connections which can be active before running out of TCP spoofing resources, since any active TCP connections which do not require high throughput will not be allocated spoofing resources.

In the discriminating steps 210 and 224, a variety of criterion may be used. In one example, the criterion for identifying TCP connections that are eligible for spoofing or identifying which TCP connections should use which sets of parameters is the TCP port number field contained in the TCP packets being sent. In general, unique port numbers are assigned to each type of application. Which TCP port numbers should and should not be spoofed and which spoofed TCP port numbers should be matched to which spoofing parameter sets can be stored in the selective spoofer 122. The selective spoofer 122 is also re-configurable to allow a user or operator to reconfigure these TCP port number mappings. The selective spoofer 122 also permits a user or operator to control which TCP connections are to be spoofed and which parameter sets are used to spoofed them based on other criteria. In general, a decision on whether to spoof a TCP connection may be based on any field within a TCP packet. The selective spoofer 122 permits a user to specify which fields to examine and which values in these fields identify TCP connections that should or should not be spoofed.

Another example of a potential use for this capability is for the user or operator to select the IP address of the TCP packet in order to control for which users TCP spoofing is performed. The selective spoofer 122 also permits a user to look at multiple fields at the same time. As a result, the selective spoofer 122 permits a user or operator to use multiple criteria for selecting TCP connections to spoof. For example, by selecting both the IP address and the TCP port number fields, the system operator can enable TCP spoofing for only specific applications from specific users.

The user configurable rules may include five exemplary criteria which can be specified by the user or operator in producing a selective TCP spoofing rule:
  Destination IP address;
  Source IP address;
  TCP port numbers (which may apply to both the TCP destination and source port numbers);
  TCP options; and
  IP differentiated services (DS) field.

As outlined above, in addition to supporting selective TCP spoofing rules for each of these criterion, AND and OR combination operators can be used to link criteria together. For example, using the AND combination operator, a rule can be defined to disable TCP spoofing for FTP data received from a specific host. Also, the order in which the rules are specified may be significant. It is possible for a connection to match the criteria of multiple rules. Therefore, the selective spoofer 122 can apply rules in order specified by the operator, taking the action of the first rule that matches. A default rule may also be set which defines the action to be taken for TCP connections which do not match any of the defined rules. The set of rules selected by the operator may be defined in a selective TCP spoofing selection profile. The parameter sets used for connections which are spoofed may be defined in one or more TCP spoofing parameter profiles.

As an example, assume enough buffer space has been allocated to spoof five (5) TCP connections. If four (4) low speed applications (i.e. applications which, by their nature, do not require high speed) bring up connections along with one high speed application, the high speed connection has access to only ⅕ the available spoofing buffer space. Further, if five (5) low speed connections are brought up before the high speed connection, the high speed connection cannot be spoofed at all. Using the selective spoofer 122, the low speed connections are not allocated any spoofing buffer space. Therefore, the high speed connection always has access to all of the buffer space, improving its performance with respect to an implementation without the selective spoofer 122.

Extending the example, assume that two high speed connections are selected to be spoofed but one of the connections originates from a local host connected directly to the spoofer while the other connection originates from a distant host separated from the spoofer by a wide area connection. Using selection criteria, the spoofer can select a parameter set appropriate (e.g. using a small value for the retransmission timeout) for the local connection and an appropriate parameter set (e.g. using a larger value for the retransmission timeout) for the distant connection.

The parameter retransmission timeout determines the timeout period for waiting for an acknowledgement for a transmitted segment. A shorter timeout allows quicker recovery from lost packets but the timeout must be at least big enough to account for the worst case latency between the selective spoofer 122, 142 and the host 110, 150. Therefore, different values may be useful for hosts 110 which are local to the selective spoofer 122 and hosts 150 which are farther away. If some hosts are local and some hosts are farther away, a selection rule can be defined to distinguish between these hosts by application if they use different applications or by IP subnet if they use the same applications, allowing the use of a smaller response timeout for the local hosts and a larger response timeout for hosts which are farther away.

This improves performance for both connections. The local connection does not have to wait for a longer period of time to recover from a lost packet and the distant connection will not erroneously retransmit a packet when the acknowledgement is delayed crossing the wide area link.

In the above example, a local host may be defined as a host 110 that is local to the selective spoofer 122, that is, a host which is connected to the same IP subnet as the selective spoofer 122 or to an IP subnet which is attached to the IP subnet of the selective spoofer 122 only via high speed connections (e.g. LAN connections). Distant hosts which are not local to the selective spoofer 122 are hosts 150 which are connected to the IP subnet of the selective spoofer 122 via some kind of wide area link (e.g. a T1 connection through a Frame Relay network). Hosts accessed via the Internet are generally not considered local.

The selective spoofer 122 of the present invention adds to conventional spoofing the ability to discriminate among different TCP connections, only allocating TCP spoofing resources to those connections for which spoofing will actually improve performance and assigning spoofing parameters based on specific application characteristics (e.g. the type of application, the location of the originator of the connection, etc.).

Other parameters may also be used in a TCP spoofing parameter set. These parameters can be configured as a set, allowing many potential combinations (i.e. unique sets) and, thus, providing a capability to tune spoofing behavior. Below is a discussion of several other exemplary parameters.

Another parameter that may be used in a TCP spoofing parameter set is maximum transmission unit (MTU). This is the maximum transmission unit size expected for the path between the selective spoofer 122, 142 and the host 110, 150. Neither the host nor the selective spoofer 122, 142 can send TCP segments larger than this value. If different hosts are at different locations where the MTUs in between the selective spoofer 122, 142 and the hosts are different, a selection rule can be used to distinguish between the two hosts by application (e.g. TCP port number) if they use different applications or by IP subnet (i.e. IP address plus IP subnet mask) if they use the same applications or by specific IP address.

Another parameter that may be used in a TCP spoofing parameter set is maximum segment size (MSS). This is the maximum segment size to be used for the connection. The MSS is usually determined from the MTU but some hosts may support an MSS which is significantly smaller than the MTU allows. Different hosts may support different maximum segment sizes. To handle this, a selection rule can be used to distinguish between the two hosts by application (if they use different applications) or by IP subnet (if they are at different locations) or by IP address.

Still another parameter that may be used in a TCP spoofing parameter set is three-way handshake spoofing. This parameter controls whether or not the TCP three-way handshake is spoofed. One reason to disable three-way handshake spoofing is for hosts for which the operator is not sure what the supported MSS value is in the hosts. To support having three-way handshake spoofing enabled for some hosts and not enabled for other hosts, a selection rule can be defined to differentiate the hosts by application (if they use different applications) or by IP subnet (if they are at different locations) or by IP address.

Still another parameter that may be used in a TCP spoofing parameter set is connection priority. This parameter selects the priority of the connection being spoofed. Priority, in turn, can be used to control how many connections actually get spoofed (with respect to available spoofing resources such as control blocks), how much buffer space is available to the spoofed connection, etc.). The amount of buffer space assigned to a connection affects the total throughput possible. An operator can configure the selective spoofer 122, 142 to allow higher throughput for certain types of applications or hosts than for others, either to optimize overall system performance or to provide different classes of services. A selection rule can be defined to distinguish between connections of various applications or various hosts, assigning different buffer space resources to each.

Another parameter that may be used in a TCP spoofing parameter set is maximum advertised window size. This parameter limits the maximum window size advertised to a host at any given time. This is used to control how much data is accepted from the host and buffered in the selective spoofer 122, 142. A smaller maximum advertised window keeps an application from dumping all of its data into the selective spoofer 122, 142 and thus making the application think it is done when it is not. More importantly, a smaller window allows the selective spoofer 122, 142 to slow down the connection sooner if congestion occurs on the backbone link 130. A larger maximum advertised window is useful when the latency between the selective spoofer 122, 142 and the host is larger and thus the local round trip time can be a limiting factor re throughput. If some hosts are local and some hosts are farther away, a selection rule can be defined to distinguish between these hosts by application if they use different applications or by IP subnet if they use the same applications, allowing the use of smaller maximum advertised window size for the local hosts and a larger maximum advertised window size for hosts which are farther away.

Another parameter that may be used in a TCP spoofing parameter set is number of retransmissions. This parameter determines the number of times the selective spoofer 122, 142 will retransmit a segment to a host before deciding that the connection has failed. A smaller value for the number of retransmissions allows the selective spoofer 122, 142 to declare a connection as failed sooner and free up spoofing resources (include buffer space). A larger value for the number of retransmissions prevents the selective spoofer 122, 142 from declaring a connection as failed prematurely when the problem may have really been a transient network problem in between the selective spoofer 122, 142 and the host. If some hosts are local (and hence network problems are less likely to cause dropped packets) and some hosts are farther away (and hence network problems are more likely to cause dropped packets), a selection rule can be defined to distinguish between these hosts (by application if they use different applications or by IP subnet if they use the same applications), allowing the use of smaller number of retransmissions for the local hosts and a larger number of retransmissions for hosts which are farther away.

Still another parameter that may be used in a TCP spoofing parameter set is fast retransmission threshold. This parameter determines when the selective spoofer 122, 142 decides, based, for example, on the number of duplicate acknowledgements received, whether a packet was lost enroute to the host and should be retransmitted without waiting for the retransmission timer to expire. This provides much faster recovery from dropped packets. A smaller value for the fast retransmission threshold provides faster recovery from dropped packets but increases the possibility of unnecessarily retransmitting a packet which was just reordered by the network in between the selective spoofer 122, 142 and the host. Unnecessary retransmissions waste bandwidth. If some hosts are local (and hence packet recording is impossible or at least very unlikely) and some hosts are farther away (and hence packet reordering is more likely), a selection rule can be defined to distinguish between these hosts (by application if they use different applications or by IP subnet if they use the same applications), allowing the use of smaller fast retransmission threshold for the local hosts and a larger fast retransmission threshold for hosts which are farther away.

Another parameter that may be used in a TCP spoofing parameter set is the keep alive timeout. This parameter determines how frequently the selective spoofer 122, 142 sends a keep alive message to the host when the connection is idle to make sure that the host is still alive and wants the connection to stay up. This timeout may have a wide range (from seconds to hours). A value of zero can disable sending keep alives altogether. A smaller value for the keep alive timeout allows detection of connection failures faster but at the expense of increased traffic during idle periods. Faster detection allows spoofing resources (e.g. control blocks) to be freed up sooner.

For connections which are considered important (either because of the application or because of the user), the operator can select a short keep alive timeout to detect failures quickly. For connections which are considered less important, the operator can select a long keep alive timeout (or disable keep alives altogether) to save bandwidth between the selective spoofer 122, 142 and the host. A selection rule can be defined to distinguish between these connections by application, by IP subnet or by IP address allowing the use of a smaller keep alive timeout for the "important" connections and a larger keep alive timeout for the "less important" connections.

Figure 3:
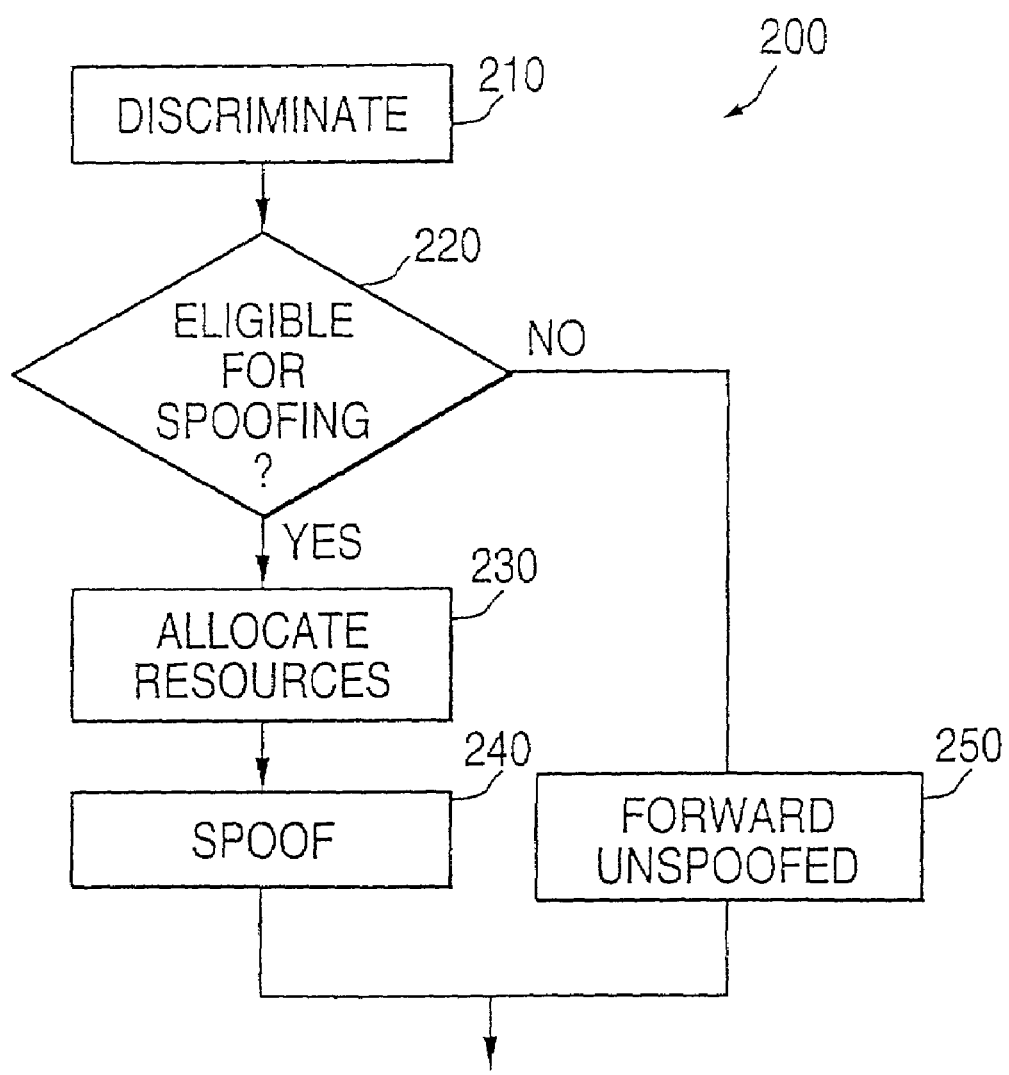
FIGS. 3A and 3B illustrate the operation of the selective spoofer of the present invention in an exemplary embodiment.

Although the present invention has been described in conjunction with exemplary FIGS. 2–3, the present invention may be varied in many ways obvious to one of ordinary skill in the art. For instance, although the present invention describes spoofing some connections based on their associated applications, any other performance enhancing function known to one of ordinary skill in the art could also be implemented.

Similarly, although the various parameters discussed above in conjunction with FIGS. 2–3 for determining what connections to spoof include destination address, source address, destination port number, source port number, options, a differentiated services (DS) field, and type of data contained therein, any other parameters known to one of ordinary skill in the art could also be utilized.

Similarly, although the various parameters discussed above in conjunction with FIGS. 2–3 for determining what parameters to vary and how, once a determination to spoof a particular connection has been made, include maximum transmission unit (MTU), maximum segment size (MSS), three-way handshake spoofing, connection priority, maximum advertised window size, response (or retransmission) timeout, number of retransmissions, fast retransmission threshold, and keep alive timeout, any other parameters known to one of ordinary skill in the art, could also be utilized. It is further noted that, where feasible, one or more of the connection spoofing determining parameters could be used as an actual spoofing parameter and vice versa.

Further, although the network parameter being improved above is throughput, selective spoofing could be employed to improve any other network parameter known to one of ordinary skill in the art.

Further, the selective spoofing performance enhancing function may be implemented alone or in conjunction with other performance enhancing functions, including, but not limited to three-way handshake spoofing, local data acknowledgement, TCP Connection to Backbone Connection Multiplexing, data compression/encryption, connection prioritization, and connection path selection.

Further, although the present invention has been described above using the TCP, TCP/IP, or UDP protocols, any high layer protocol known to one of ordinary skill in the art could also be utilized. Although the present invention has been described above in conjunction with a satellite link, any impaired link, that is any link with at least one potentially negative parameter (high latency, high bit error rate, etc.) could also benefit from selective TCP spoofing features of the present invention. Although the various selective TCP spoofing features of the present invention have been described as taking place within a network gateway, these functions could be performed within any network element, including, but not limited to, a host, a hub, a VSAT, a switch, and a router.

Further, although the functionality described above in conjunction with the present invention has been described as being originally resident within a network element, the functionality may be added to an existing network element, via software loaded from an article of manufacture or software downloaded via a propagated signal.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A device for use in a system comprising said device, a first apparatus, and a second apparatus, said device comprising:

a selective spoofing unit that (a) obtains, from a transport level connection between the first apparatus and the second apparatus, a transport level packet sent by the first apparatus to the second apparatus, (b) determines, in accordance with a value in a field of the transport level packet, what application is using the transport level connection, (c) decides whether or not to perform transport level spoofing on the transport level connection, in accordance with the determination of what application is using the transport level connection, (d) selectively performs transport level spoofing on the transport level connection in accordance with the decision of whether or not to perform transport level spoofing, wherein the transport level spoofing comprises (i) locally acknowledging, to the first apparatus, receipt of the transport level packet and (ii) taking on, from the first apparatus, the responsibility of retransmitting the transport level packet if necessary, (e) decides, in a case that said selective spoofing unit has decided to perform transport level spoofing on the transport level connection, whether or not to modify the transport level packet, in accordance with the determination of what application is using the transport level connection, (f) selectively modifies the transport level racket in accordance with the decision of whether or not to modify the transport level packet, and (g) sends the transport level packet, having been modified if such is decided, to the second apparatus, wherein at least one of the following conditions is satisfied:

(1) the selective modification comprises varying the following field of the transport level packet: a TCP Option, TCP Maximum Segment Size;

(2) the selective modification comprises varying the following field of the transport level packet: a three-way handshake parameter field, and (3) the selective modification comprises varying the following field of the transport level packet: a connection priority field.

2. The device of claim 1, wherein said selective spoofing unit only spoofs connections associated with high throughput applications.

3. The device of claim 1, wherein said selective spoofing unit assigns spoofing resources, including buffer space and control blocks, to the spoofed transport level connection.

4. The device of claim 1, wherein said selective spoofing unit determines what application is using the transport level connection in accordance with a TCP port number field of the transport level packet.

5. The device of claim 1, wherein the transport level connection uses one of the Transmission Control Protocol (TCP) and the User Datagram Protocol (UDP).

6. The device of claim 1, wherein said apparatus is connected to another apparatus via a backbone connection.

7. The device of claim 6, wherein the backbone connection is via a wireless link.

8. The device of claim 7, wherein the wireless link has high latency and high error rate.

9. The device of claim 7, wherein the wireless link is a satellite link.

10. The device of claim 1, wherein said apparatus is a component of a network gateway.

11. The device of claim 1, wherein said apparatus is a component of a host.

12. The device of claim 1, wherein said apparatus is a component of a hub.

13. The device of claim 1, wherein said apparatus is a component of a switch.

14. The device of claim 1, wherein said apparatus is a component of a VSAT.

15. The device of claim 1, wherein said apparatus is a component of a router.

16. The device according to claim 1, wherein condition (1) is satisfied.

17. The device according to claim 1, wherein conditions (1) and (3) are satisfied.

18. A method comprising:
obtaining, from a transport level connection between a first apparatus and a second apparatus, a transport level packet sent by the first apparatus to the second apparatus;
determining, in accordance with a value in a field of the transport level packet, what application is using the transport level connection;
deciding, in accordance with the determination of what application is using the transport level connection, whether or not to perform transport level spoofing on the transport level connection;
selectively performing transport level spoofing on the transport level connection in accordance with the decision, wherein the transport level spoof comprises (a) locally acknowledging, to the first apparatus, receipt of the transport level packet and (b) taking on, from the first apparatus, the responsibility of retransmitting the transport level packet to the second apparatus if necessary;
determining, in accordance with the determination of what application is using the transport level connection, whether or not to modify the transport level packet before forwarding the same to the second apparatus;
selectively modifying the transport level packet in accordance with the determination of whether or not to modify the transport level packet; and
sending the transport level packet, whether modified or not, to the second apparatus,
wherein at least one of the following conditions is satisfied:
(1) said selective modifying comprises varying the following field of the transport level packet: a TCP Option, TCP Maximum Segment Size;
(2) said selective modifying comprises varying the following field of the transport level packet: a three-way handshake parameter field; and
(3) said selective modifying comprises varying the following field of the transport level packet: a connection priority field.

19. The method of claim 18, wherein said selective spoofing step only spoofs connections associated with high throughput applications.

20. The method of claim 18, wherein said selective spoofing step assigns spoofing resources, including buffer space and control blocks, to the spoofed transport level connection.

21. The method of claim 18, wherein said selective spoofing step determines what application is using the transport level connection in accordance with a TCP port number field of the transport level packet.

22. The method of claim 18, wherein the transport level connection uses one of the Transmission Control Protocol (TCP) and the User Datagram Protocol (UDP).

23. The method of claim 18, wherein said method is performed in a network gateway.

24. The method of claim 18, wherein said method is performed in a host.

25. The method of claim 18, wherein said method is performed in a hub.

26. The method of claim 18, wherein said method is performed in a switch.

27. The method of claim 18, wherein said method is performed in a VSAT.

28. The method of claim 18, wherein said method is performed in a router.

29. A device for use in a system comprising said device, a first apparatus, and a second apparatus, said device comprising:
a selective spoofing unit that (a) obtains, from a transport level connection between the first apparatus and the second apparatus, a transport level packet sent by the first apparatus to the second apparatus, (b) decides whether or not to perform transport level spoofing on a transport level connection, in accordance with information in the transport level packet, (c) selectively performs transport level spoofing on the transport level connection in accordance with the decision of whether or not to perform transport level spoofing, wherein the transport level spoofing comprises (i) locally acknowledging, to the first apparatus, receipt of the transport level packet and (ii) taking on, from the first apparatus, the responsibility of retransmitting the transport level packet if necessary, (d) decides, in a case that said selective spoofing unit has decided to perform transport level spoofing on the transport level connection, whether or not to modify the transport level packet, in accordance with a field in the transport level packet, (e) selectively modifies the transport level packet in accordance with the decision of whether or not to modify the transport level packet, and (f) sends the transport level packet, having been modified if such is decided, to the second apparatus,
wherein at least one of the following conditions is satisfied:
(1) the selective modification comprises varying the following field of the transport level packet: a TCP Option, TCP Maximum Segment Size;
(2) the selective modification comprises varying the following field of the transport level packet: a three-way handshake parameter field;
(3) the selective modification comprises varying the following field of the transport level packet: a connection priority field.

30. The device according to claim 29, wherein the information comprises a destination network level address field in the transport level packet.

31. The device according to claim 29, wherein the information comprises a source network level address field in the transport level packet.

32. The device according to claim 29, wherein the field information comprises a destination port number field in the transport level packet.

33. The device according to claim 29, wherein the information comprises a source port number field in the transport level packet.

34. The device according to claim 29, wherein the information comprises a transport level options field field in the transport level packet.

35. The device according to claim 29, wherein the information comprises a differentiated services (DS) field in the transport packet.

36. The device according to claim 29, wherein the information comprises a plurality of fields, in the transport level packet selected from the group consisting a destination IP address, a source IP address, a TCP destination port number, a TCP source port number, a TCP options field, and an IP differentiated services (DS) field.

37. The device according to claim 29, wherein the information comprises an IP address and a TCP port number.

38. The device according to claim 29, wherein the information is a TCP field.

39. A method comprising:
obtaining, from a transport level connection between a first apparatus and a second apparatus, a transport level packet sent by the first apparatus to the second apparatus;
deciding, in accordance with information in the transport level packet, whether or not to perform transport level spoofing on the transport level connection;
selectively performing transport level spoofing on the transport level connection in accordance with the decision, wherein the transport level spoofing comprises (a) locally acknowledging, to the first apparatus, receipt of the transport level packet and (b) taking on, from the first apparatus, the responsibility of retransmitting the transport level packet to the second apparatus if necessary;
determining, in accordance with a field in the transport level packet, whether or not to modify the transport level packet before forwarding the same to the second apparatus;
selectively modifying the transport level packet in accordance with the determination of whether of not to modify the transport level packet; and
sending the transport level packet, whether modified or not, to the second apparatus,
wherein at least one of the following conditions is satisfied:
(1) said selective modifying comprises varying the following field of the transport level packet: a TCP Option, TCP Maximum Segment Size;
(2) said selective modifying comprises varying the following field of the transport level packet: a three-way handshake parameter field;
(3) said selective modifying comprises varying the following field of the transport level packet: a connection priority field.

40. A device for use in a system comprising said device, a first apparatus, and a second apparatus, said device comprising:
means for obtaining, from a TCP connection between the first apparatus and the second apparatus, a TCP packet sent by the first apparatus to the second apparatus;
first determining means for determining, in accordance with the TCP port number field of the TCP packet, whether or not to perform TCP spoofing;
means for performing TCP spoofing in accordance with the determination by said first determining means, wherein the TCP spoofing comprises (a) locally acknowledging, to the first apparatus, receipt of the transport level packet and (b) taking on, from the first apparatus, the responsibility of retransmitting the transport level packet to the second apparatus if necessary;
second determining means for determining, in accordance with the TCP port number field of the TCP packet, whether or not to vary a field of the TCP packet before forwarding the same to the second apparatus;
means for varying a field of the TCP packet in accordance with the determination by said second determining means, wherein the field is the TCP Option, TCP Maximum Segment Size; and
means for sending the TCP packet, whether varied or not, to the second apparatus.

* * * * *